US008675351B2

(12) United States Patent
Zhou et al.

(10) Patent No.: US 8,675,351 B2
(45) Date of Patent: Mar. 18, 2014

(54) SLIDING MODULE, A SLIDING APPARATUS AND AN ELECTRONIC DEVICE USING THE SAME

(75) Inventors: Hu Zhou, Shenzhen (CN); Ruiqiang Luo, Shenzhen (CN); Tongbo Sun, Shenzhen (CN); Xiulan Fan, Shenzhen (CN); Dajun Chen, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 1153 days.

(21) Appl. No.: 12/623,274

(22) Filed: Nov. 20, 2009

(65) Prior Publication Data
US 2010/0128422 A1 May 27, 2010

(30) Foreign Application Priority Data

Nov. 27, 2008 (CN) ...................... 2008 2 0214046 U

(51) Int. Cl.
*H05K 5/03* (2006.01)

(52) U.S. Cl.
USPC .................................. 361/679.01; 455/575.4

(58) Field of Classification Search
USPC ................... 188/69–72, 287, 291; 455/575.4; 361/679.01, 681; 379/433.12
See application file for complete search history.

(56) References Cited

U.S. PATENT DOCUMENTS

| 7,822,447 | B2 * | 10/2010 | Kim ........................... 455/575.4 |
| 2006/0258413 | A1 * | 11/2006 | Park ........................... 455/575.4 |
| 2008/0113645 | A1 * | 5/2008 | Kim ............................... 455/348 |
| 2008/0158832 | A1 * | 7/2008 | Park et al. ...................... 361/727 |
| 2010/0128422 | A1 * | 5/2010 | Zhou et al. ............... 361/679.01 |

* cited by examiner

*Primary Examiner* — Christopher Schwartz
(74) *Attorney, Agent, or Firm* — Morgan, Lewis & Bockius LLP

(57) ABSTRACT

The present invention provides a sliding module comprising a plurality of guiding rods; a plurality of elastic members; a first component having a first fastener and a plurality of guiding apertures; and a second component having a second fastener and a plurality of fastening holes that correspond to the plurality of guiding apertures of the first component; wherein the first component and the second component are configured to slide with respect to each other; each of the elastic members is configured to shield a respective guiding rod; each of the guiding rods is configured to be fastened in a respective fastening hole at the second component, and traverse through a respective guiding aperture at the first component; and a longitudinal axis across the respective centers of the first fastener and the second fastener is configured to be parallel to each of the guiding rods.

15 Claims, 18 Drawing Sheets

PRIOR ART

*PRIOR ART*

*PRIOR ART*

PRIOR ART

SLIDING MODULE, A SLIDING APPARATUS AND AN ELECTRONIC DEVICE USING THE SAME

CROSS-REFERENCE TO RELATED APPLICATION

This application claims priority to and benefit of Chinese Patent Application Ser. No. 200820214046.3, filed in the State Intellectual Property Office of the P. R. China on Nov. 27, 2008, the entire contents of which are incorporated herein by reference.

BACKGROUND OF THE INVENTION

1. Field of the Invention

The present invention relates to a portable information terminal, in particular, relates to a sliding module, a sliding apparatus and an electronic device using the same.

2. Background of the Related Art

The portable information terminal may be categorized by the product case design, for example, straight-cover style, flip-cover style, fold-cover style and sliding-cover style.

A straight-cover portable information terminal is configured with a single housing case, on which a data input/output unit, a transmitter and a receiver are mounted. The mini keyboard acted as the data input/output unit is disposed uncovered. As a result, the mini keyboard of the straight-cover portable information terminal may fail easily.

A flip-cover portable information terminal comprises a main body, a flip panel and a hinge module connecting the main body to the flip panel. A data input/output unit, a transmitter and a receiver are mounted on the main body of the flip-cover portable information terminal. The flip panel is configured to cover the mini keyboard as data input/output unit to prevent the mini key board from failure.

A fold-cover portable information terminal comprises a main body, a folding apparatus and a hinge module connecting the folding apparatus to the main body. The folding apparatus is configured to rotate to open and close. When the folding apparatus clings to the main body, the fold-cover portable information terminal is configured to enter a stand-by mode, thus preventing a keyboard failure.

A sliding-cover portable information terminal comprises a main body, a sliding cover sliding along the longitudinal direction of the main body and a sliding module connecting the main body to the sliding cover. FIG. 1 is a schematic diagram of a sliding module of the prior art. The sliding module comprises a first plastic flake 210, which includes a first guiding rod 213 and a first guiding hole 214; and a second plastic flake 220, which includes a second guiding rod 223 and a second guiding hole 224; wherein the plastic flake 201 is configured to connect to a main body by a first connecting part 212; and a second plastic flake 220 is configured to connect to a main body by a second connecting part 212. A spring 230 is configured between the first plastic flake 210 and the second plastic flake 220. A first sliding rod 215 and a first sliding groove 216 of the first plastic flake 210 are configured to engage with the second sliding groove 226 and the second sliding rod 225, respectively, so that the first plastic flake 210 and the second plastic flake 220 slide with respect to each other. The first plastic flake 210 and the second plastic flake 220 comprise a first fastener 212 and a second fastener 222, respectively, wherein the first fastener 212 and the second fastener 222 are configured to connect to the main body.

FIG. 2-4 are schematic diagrams of an initial state, an intermediate state and a final state of the sliding module of the prior art. The spring 230 stays in a free state at the original position. When the cover SB is pushed to move along the longitudinal direction with respect to the main body MB, the second plastic flake 220 moves with respect to the second plastic flake 210. Thus, the guiding rod traverses through the guiding hole and compresses the spring. When the guiding rod moves to a position where the first plastic flake 210 and the second plastic flake 220 are both in a horizontal level, the elastic force of the spring reaches maximum. Then the sliding module is pushed to move by the force of the spring. Meanwhile, the cover continues to move along the longitudinal direction with respect to the main body MB until the elastic force of the spring is released and the spring returns to the free state.

The longitudinal connection between the centers of the first fastener 212 and the second fastener 222 forms an angle to the orientations of the first guiding rod 213, the second guiding rod 223 and the spring 230. A torque is generated between the first plastic flake 210 and the second plastic flake during the movement of the sliding module. Therefore, the first plastic flake 210 and the second plastic flake 220 may be deformed and worn out easily.

SUMMARY OF THE INVENTION

To solve the aforementioned problems, one embodiment of the present invention provides a sliding module comprising a plurality of guiding rods; a plurality of elastic members; a first component having a first fastener and a plurality of guiding apertures; and a second component having a second fastener and a plurality of fastening holes that correspond to the plurality of guiding apertures of the first component; wherein the first component and the second component are configured to slide with respect to each other; each of the elastic members is configured to shield a respective guiding rod; each of the guiding rods is configured to be fastened in a respective fastening hole at the second component, and traverse through a respective guiding aperture at the first component; and a longitudinal axis across the respective centers of the first fastener and the second fastener is configured to be parallel to each of the guiding rods.

According to one embodiment of the present invention, when the first component and the second component are moving with respect to each other, the two components are substantially subject to the elastic forces caused by the elastic members along the direction of the guiding rods. Therefore, the torque that causes components deformation is effectively avoided during the movement.

The present invention further provides a sliding apparatus comprising a main body, a sliding case, and a sliding module, wherein the sliding module is configured to connect with main body and the sliding case; the first fastener is configured to be connected to the main body; and the second fastener is configured to be connected to the sliding case.

The present invention further provides an electronic device comprising the sliding apparatus set forth above.

BRIEF DESCRIPTION OF THE DRAWINGS

Exemplary embodiments of the present invention will be described in detail based on the following figures, wherein.

DETAILED DESCRIPTION OF THE EMBODIMENTS

Figure 1:
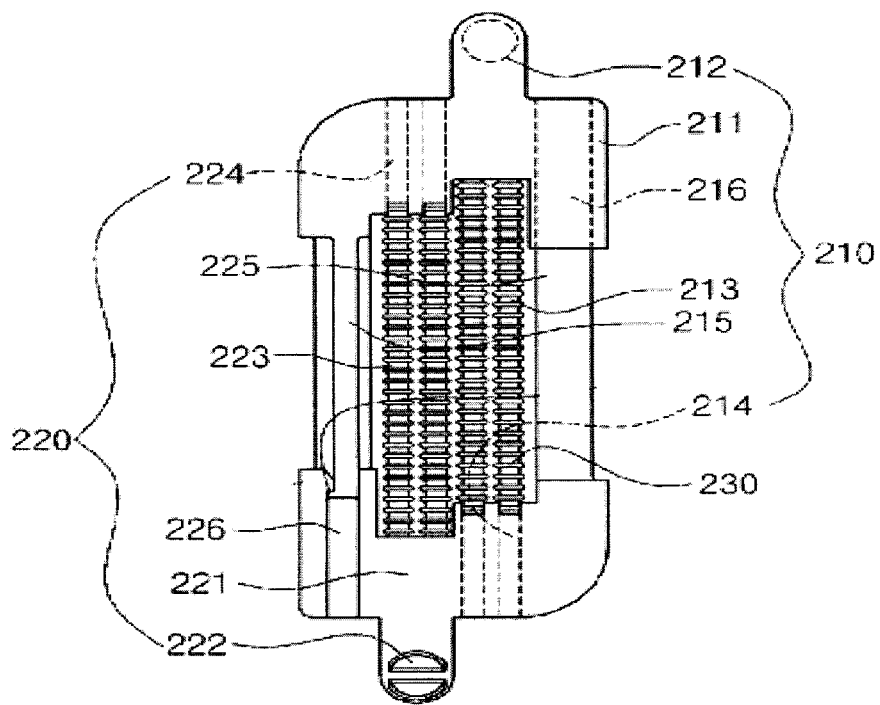
FIG. 1 is a schematic diagram of the sliding module of prior art.
Figure 2:
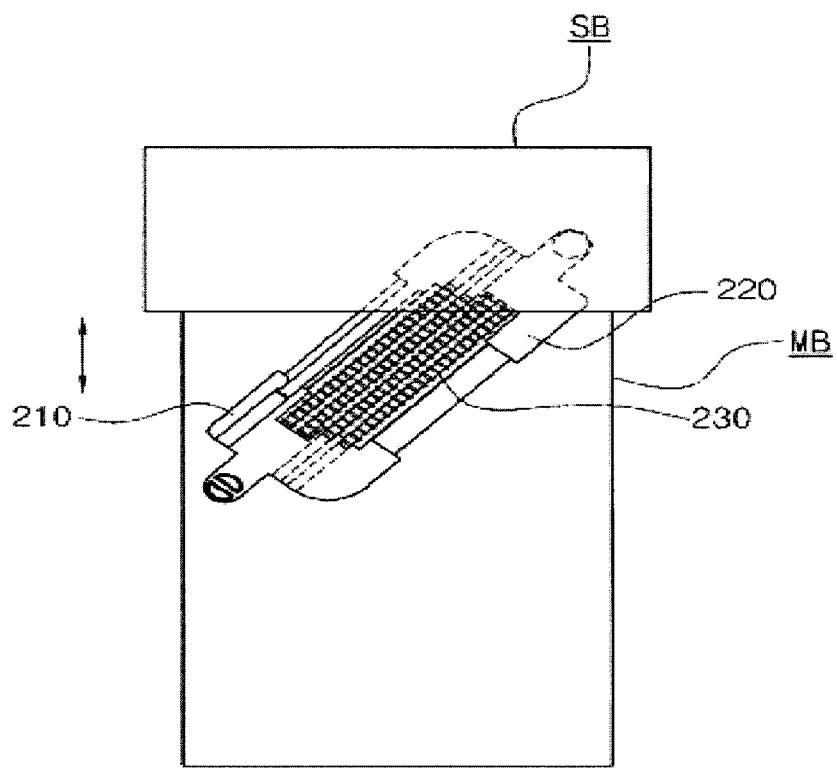
FIG. 2 is a schematic diagram of an initial state of the sliding module of the prior art.
Figure 3:
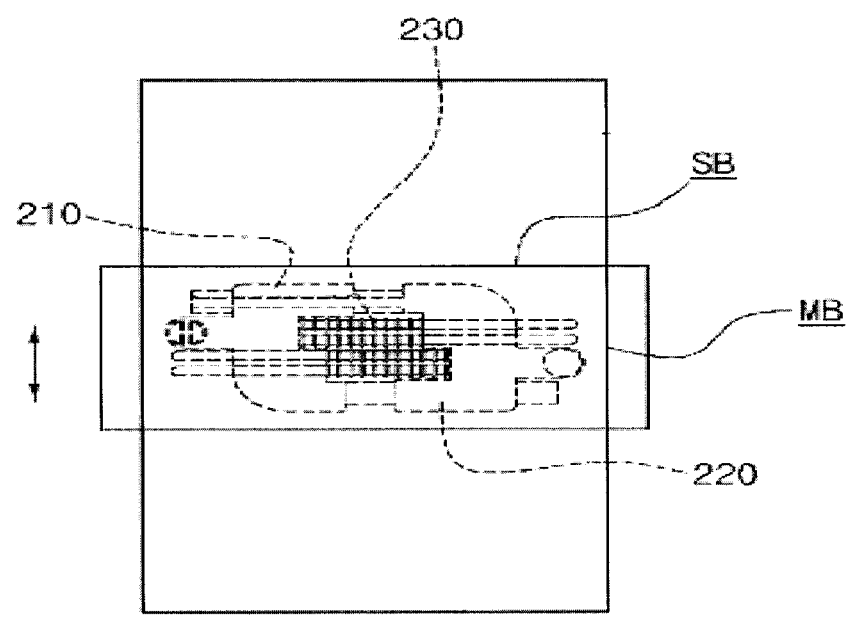
FIG. 3 is a schematic diagram of an intermediate state of the sliding module of the prior art.
Figure 4:
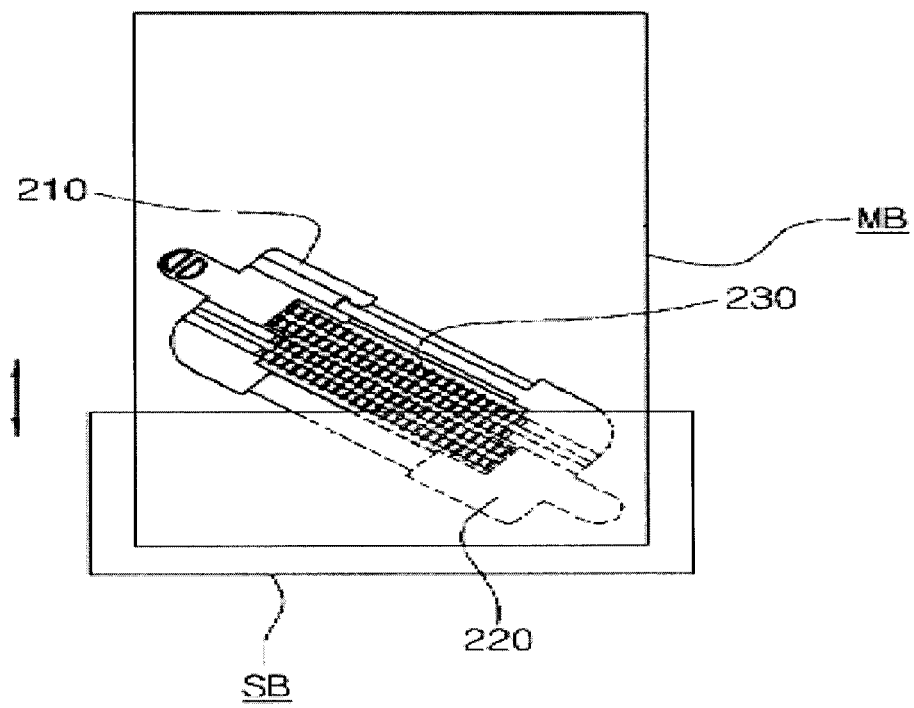
FIG. 4 is a schematic diagram of a final state of the sliding module of the prior art.
Figure 5:
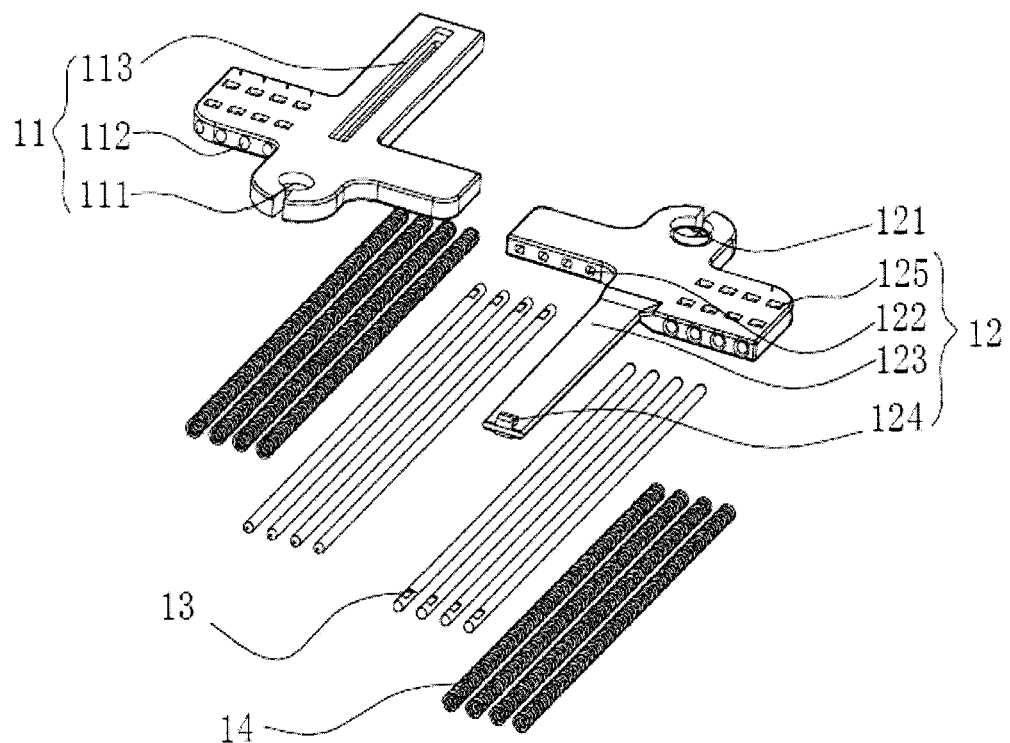
FIG. 5 is a schematic decomposition diagram of the sliding module in some embodiments of the present invention.
Figure 6:
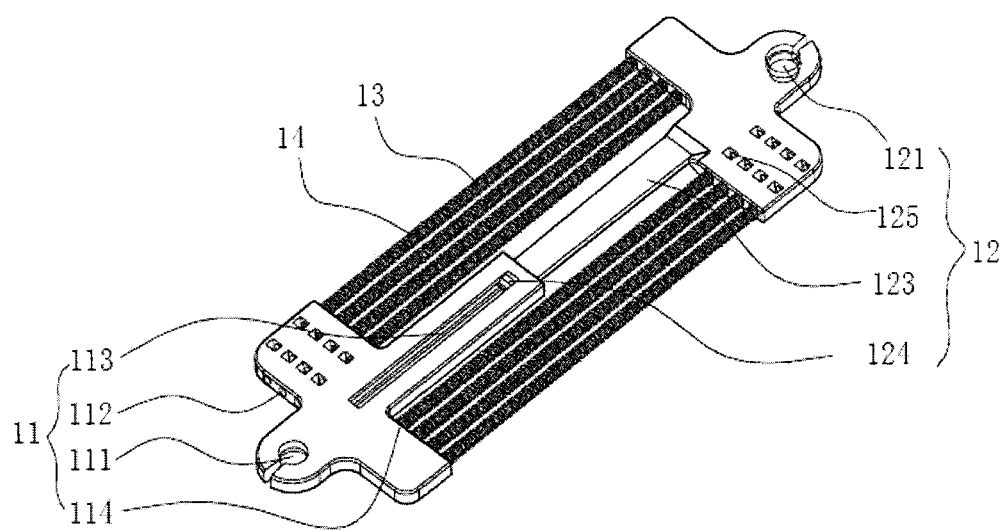
FIG. 6 is a schematic assembly diagram of the sliding module in some embodiments of the present invention.

As shown in FIG. 5 to FIG. 13, the sliding module comprises a plurality of elastic members 14, a plurality of guiding rods 13, a first component 11 and a second component 12, wherein the first component 11 and the second component 12 are configured to slide with respect to each other. The first component 11 includes a first fastener 111 and the second component 12 includes a second fastener 121. The first component 11 and the second component 12 further comprise a plurality of guiding apertures and a plurality of fastening holes, for example, the first component 11 comprises a plurality of fastening holes 114. The guiding rod 13 is configured to be fastened in the fastening hole in one end, and traverse through the guiding aperture in another end. The elastic member 14 is configured to shield the guiding rod 13. A longitudinal axis across the respective centers of the first fastener and the second fastener is configured to be parallel to the guiding rod.

Figure 7:
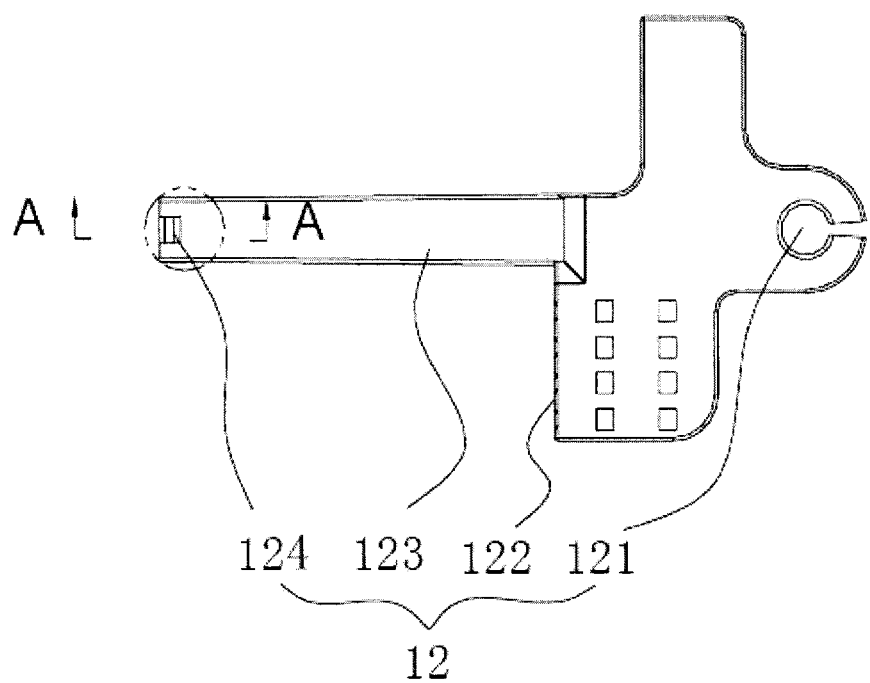
FIG. 7 is a front view of the second component in some embodiment of the present invention.
Figure 8:
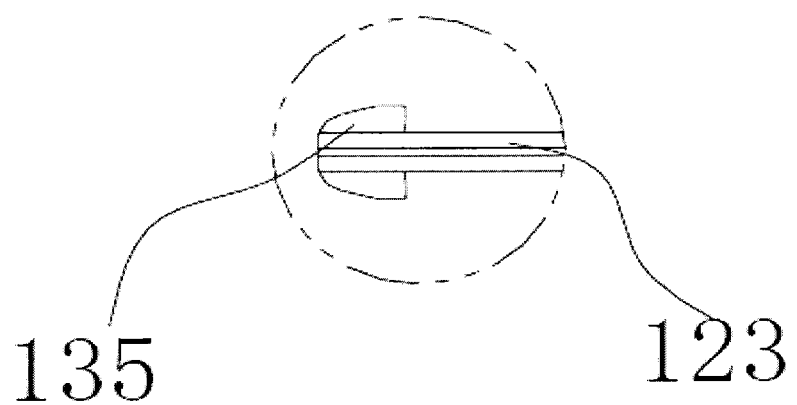
FIG. 8 is a detail view of the stopper in some embodiment of the present invention.
Figure 9:
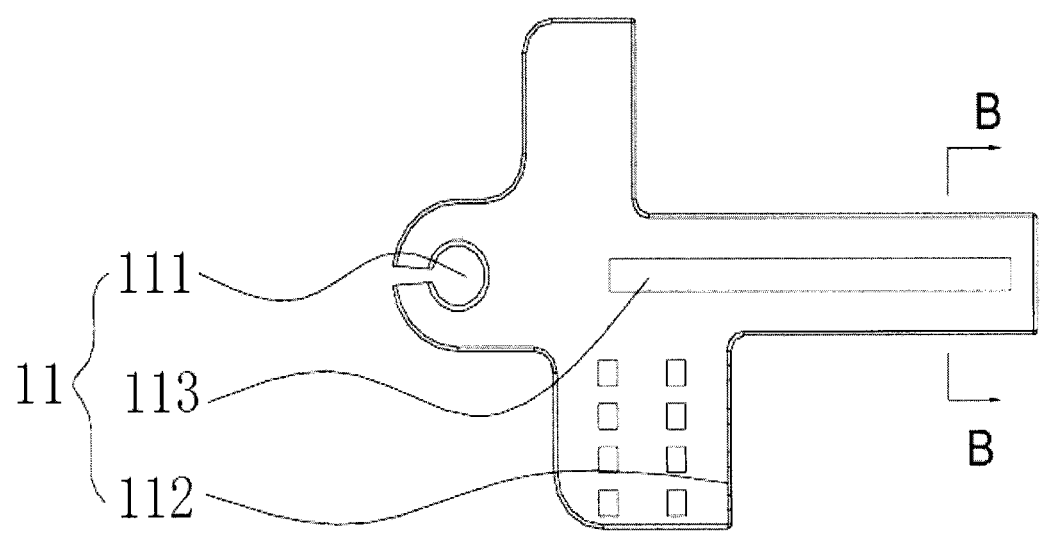
FIG. 9 is a front view of the first component in some embodiment of the present invention.
Figure 10:
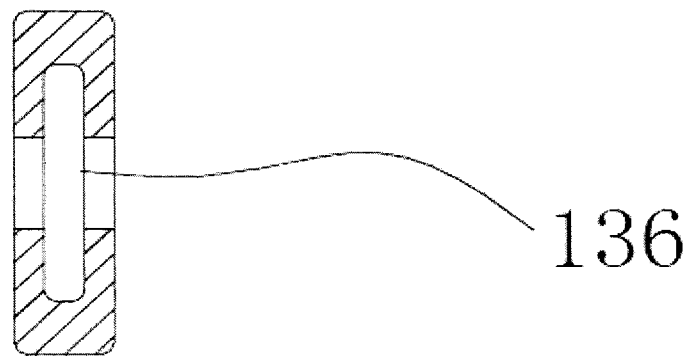
FIG. 10 is a detail view of the sliding groove in some embodiment of the present invention.

The first component 11 and the second component 12 further comprise a first sliding member and a second sliding member 123, respectively; wherein the first sliding member is configured with a sliding groove 113 such that the second sliding member 123 is configured to slide along the sliding groove. The first sliding member is configured to be disposed in the middle of the first component. The second sliding member further comprises a stopper 124 disposed at one end of the second sliding member as shown in FIG. 7, wherein the stopper 124 is configured with a protrusion 135. The first sliding member is further configured with a clamping groove 136, as shown in FIG. 10. When the elastic member 14 enters in initial state, or when the elastic force generated by the elastic member 14 reaches a predetermined value, the protrusion 135 engages with the clamping groove 136 to prevent the second sliding member 123 from being ejected from the sliding groove 113.

In some embodiment, at least one of the first component 11 and the second component 12 is configured with a plurality of guiding apertures 13, and the rest component is configured with a plurality of fastening holes 114.

In some embodiment, the guiding rod 13, the first component 11 and the second component 12 are manufactured by an injection molding technology. The guiding rod 13 fastened in the first component 11 traverses through the guiding aperture 122 in the second component 12. The guiding rod 13 fastened in the second component 12 traverses through the guiding aperture 122 in the first component 11.

When the sliding module is configured in the sliding apparatus, the first fastener 111 is configured to connect to a main body 15 of the sliding apparatus; and the second fastener 121 is configured to connect to a sliding case 16 of the sliding apparatus. The longitudinal connection between the centers of the first fastener 111 and the second fastener 121 is configured to be parallel to the sliding groove 113 and the second sliding member 123, and further maintain parallel to the guiding rod 13 and the elastic member 14 during the sliding process. Therefore, the torque that causes deformation of the two components is effectively avoided during the movement In some embodiment, the first component 11 and the second component 12 further comprise a plurality of through holes 125. The through hole 125 is configured above the guiding aperture to fasten the elastic member 14 when the elastic member 14 is compressed or expanded.

In some embodiment, the longitudinal connection between the centers of the first fastener 111 and the second fastener 121 is configured to be disposed in the middle of the sliding module.

In some embodiment, the first sliding member is configured to be disposed in the middle of the first component 11 and the second sliding member 123 is configured to be disposed in the middle of the second component 12.

In some embodiment, the quantity of the guiding rods and the elastic members are configured to be identical, and the guiding rods and the elastic members are disposed symmetrically on both sides of the first sliding member.

Figure 11:
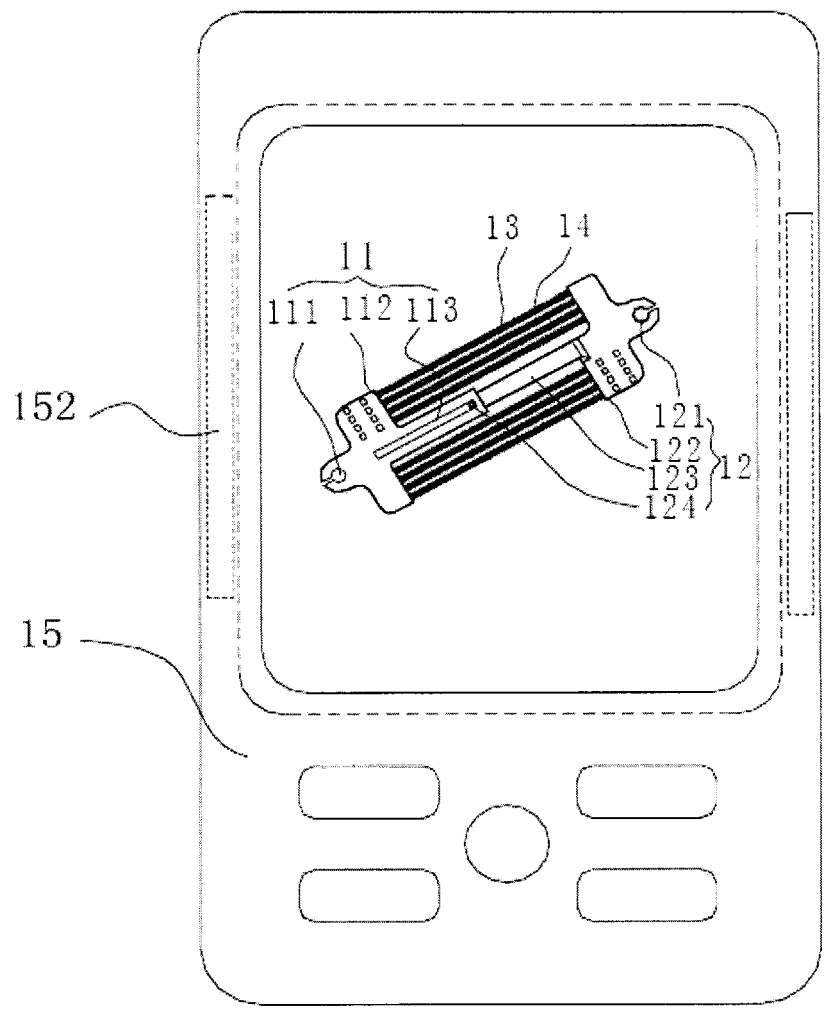
FIG. 11 is a schematic diagram of an initial state of the sliding module of in some embodiment of the present invention.

FIG. 11 is a schematic diagram of an initial state of a sliding apparatus. The sliding apparatus comprises a sliding case 15, a main body 16 and a sliding module as set forth above. The first fastener 111 is configured to connect to the sliding case 15; and the second fastener 121 is configured to connect to the main body of the sliding apparatus. In FIG. 11, the sliding module is in an initial state. And the elastic member is in a free state and no elastic force is generated.

Figure 12:
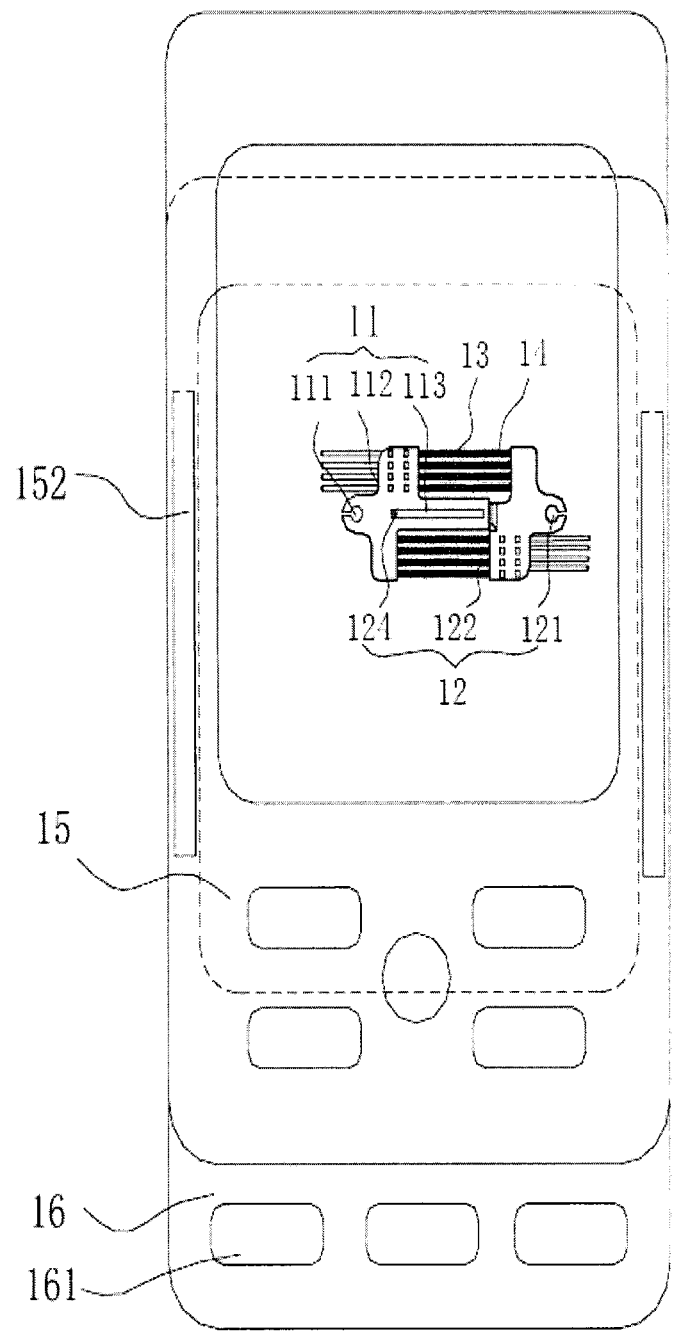
FIG. 12 is a schematic diagram of an intermediate state of the sliding module of in some embodiment of the present invention.
Figure 13:
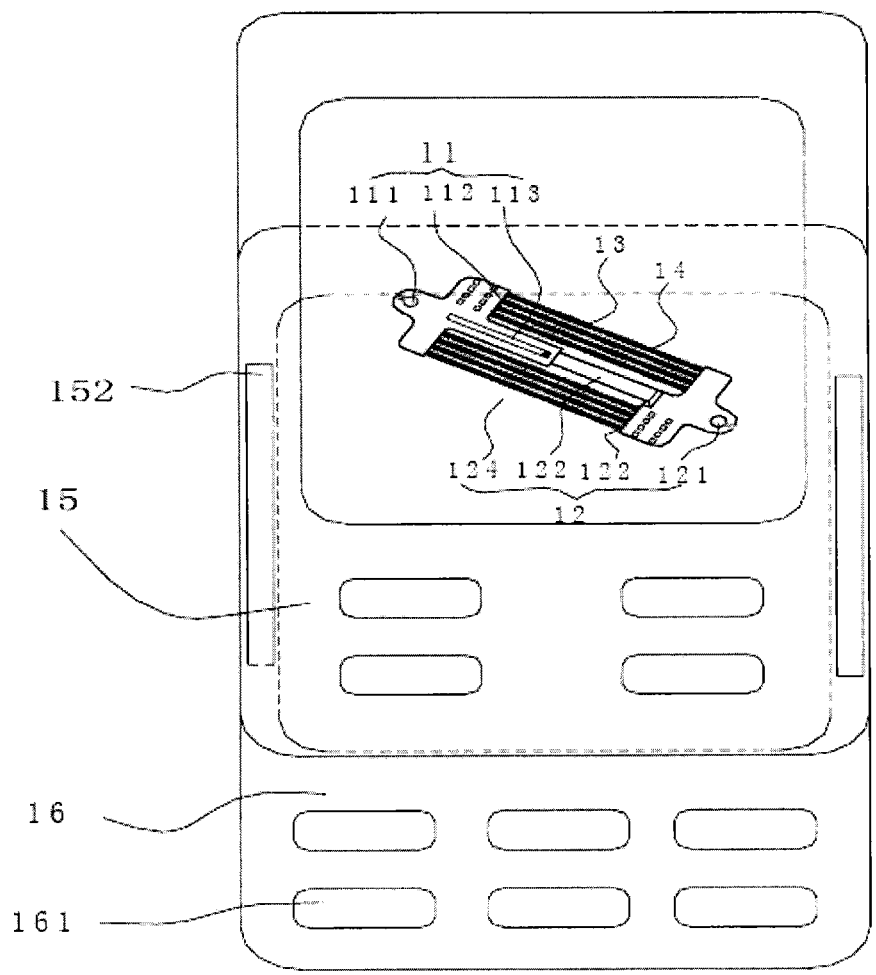
FIG. 13 is a schematic diagram of a final state of the sliding module of in some embodiment of the present invention.
Figure 14:
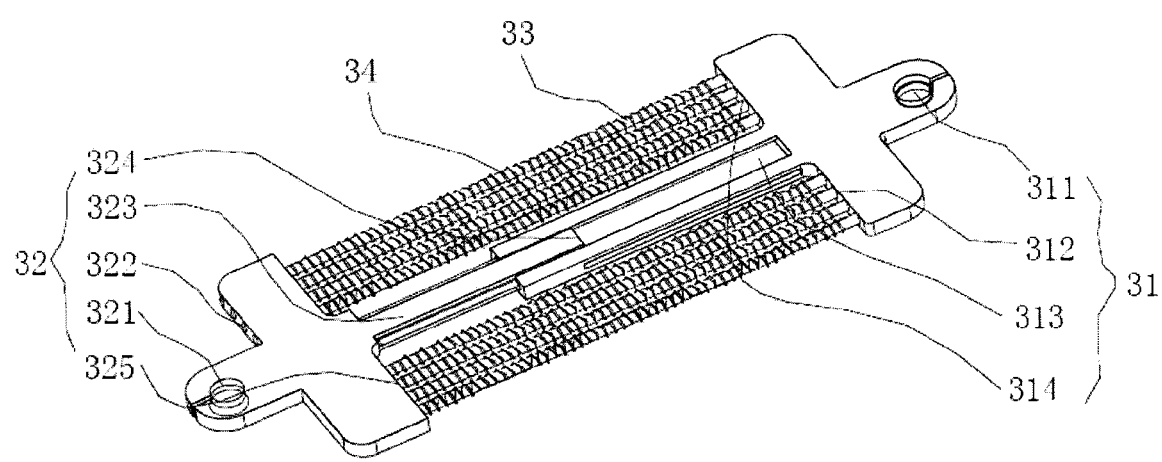
FIG. 14 is a schematic decomposition diagram of the sliding module in some embodiments of the present invention.
Figure 15:
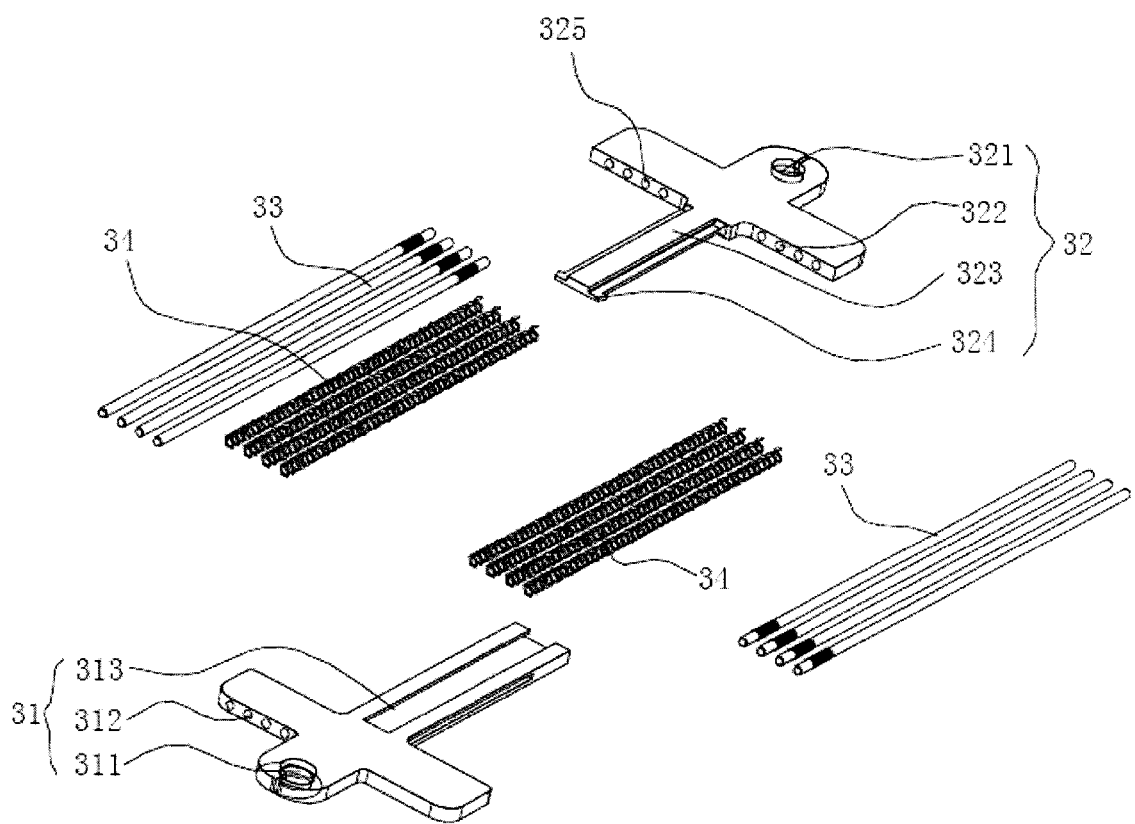
FIG. 15 is a schematic assembly diagram of the sliding module in some embodiments of the present invention.
Figure 16:
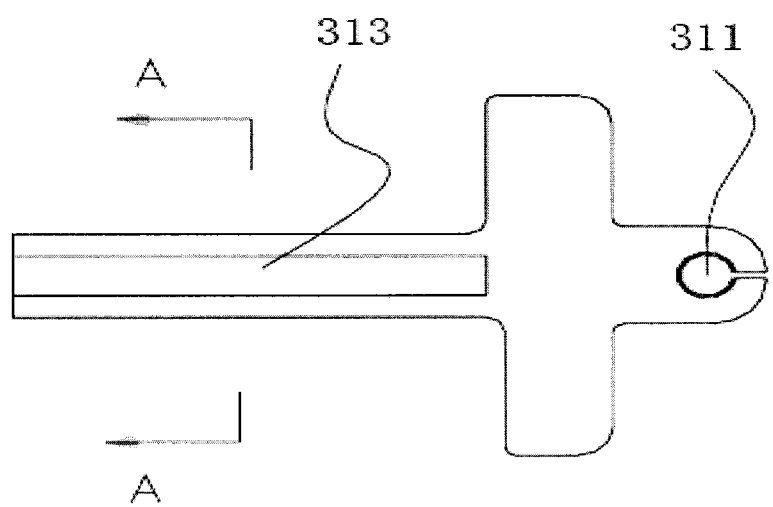
FIG. 16 is a front view of the first component in some embodiment of the present invention.
Figure 17:
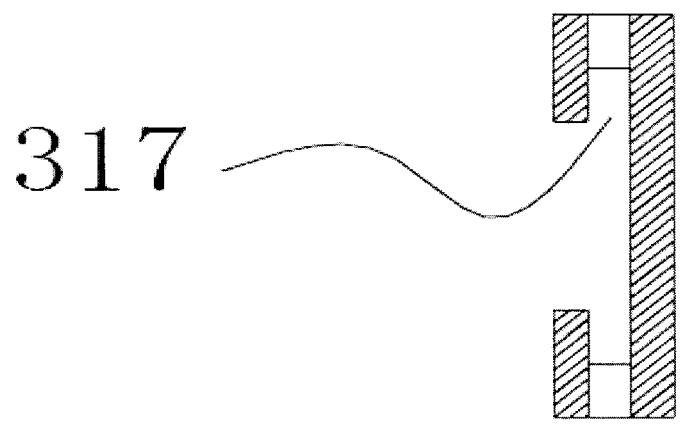
FIG. 17 is a detail view of the sliding groove in some embodiment of the present invention.

As shown in FIG. 12, when a force is exerted on the sliding case 15, the sliding case 15 starts to slide along a guiding rail 152 with respect to the main body 16. As a result, the first component 11 starts to slide with respect to the second component 12, and compresses the elastic member 14. When the stopper 124 reaches another end of the sliding groove 113, the first fastener 111 and the second fastener 121 stay in the same horizontal level; the compressed elastic force of the elastic member 14 reaches maximum; and the sliding apparatus reaches a half-open state, i.e., a stagnation state of the sliding apparatus. At this state, there is no deviating force along the sliding direction. The sliding apparatus reaches an equilibrium state.

As shown in FIG. 12, due to the elastic force generated by the elastic member, the first component 11 slides with respect to the second component 12 in an opposite direction. The sliding case 15 continues to slide with respect to the main body along the guiding rail 152 until the first component 11 returns to the original position. The elastic member returns to the free state, the sliding apparatus opens completely to show the keyboard 161, and the sliding case reaches a top position. At this state, the elastic member is still compressed to maintain a light elastic force such that the sliding case does not wobble.

When closing the sliding apparatus, a user pushes the sliding case to slide downwards along the longitudinal direction of the main body 16.

In some embodiment, the elastic member is a spring.

The sliding module in the present invention may be assembled easily, and in particular, when the sliding module comprises a plurality of small springs. Moreover, the structure of the sliding module is steady, and the spring is hard to become deformed. The first component 11 and the second component 12 do not form a torque while moving, thus reducing the deformation and the abrasion. The thickness of the sliding module is small.

In FIG. 14-18, the sliding module comprises a plurality of elastic members 34, a plurality of guiding rods 33, a first component 31 and a second component 32, wherein the first component 31 and the second component 32 are configured to slide with respect to each other. The first component 31 includes a first fastener 311 and the second component 32 includes a second fastener 321.

A plurality of guiding apertures is configured in both of the first component 31 and the second component 32. A plurality of first fastening holes 314 are configured on the first component 31. A plurality of second fastening holes 325 are configured on the second component 32. One end of the guiding rod 33 is fastened in the first fastening hole 314 or the second fastening hole 325; another end of the guiding rod 33 traverses through the guiding aperture; and the elastic member 34 is configured to shield the guiding rod 33. A longitudinal connection between the centers of the first fastener 311 and the second fastener 321 is configured to be parallel to the guiding rod 33.

A first sliding member configured on a side of the first component 31 facing the second component 32, comprises a sliding groove 313; wherein a second sliding member 323 is configured on a side of the second component 32 facing the first component 31, and the second sliding member 323 is configured to slide along the sliding groove 313. The first sliding member 323 is configured to be disposed in the middle of first component 31. A stopper 324 is configured on one end of the second sliding member 323.

Figure 18:
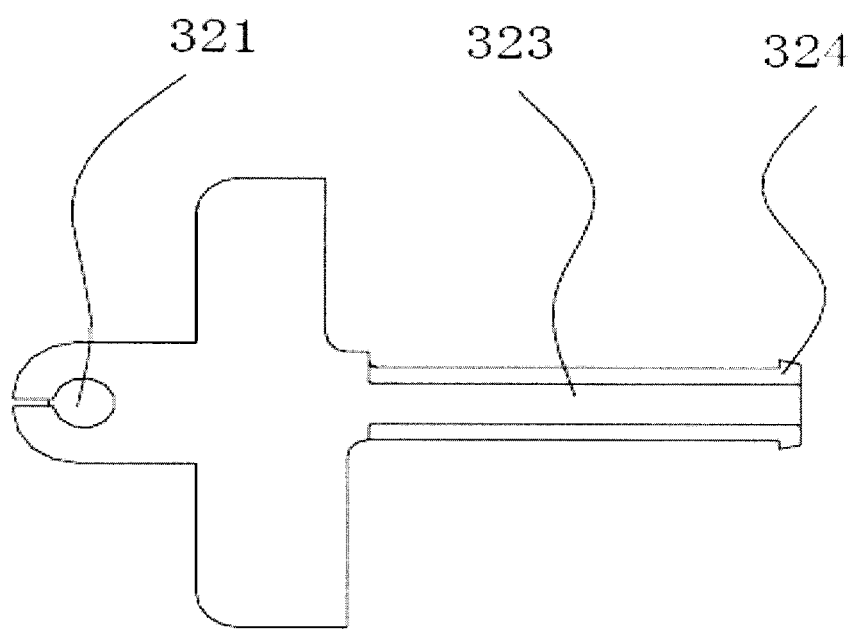
FIG. 18 is a front view of the second component in some embodiment of the present invention.

The stopper 324 shown in FIG. 18 is configured with a pigeon tail shaped slot. One end of the sliding groove is configured with a clamping component 317. Each side of the pigeon tail shaped slot is configured with a protrusion. Each side of the clamping component 317 is configured with a clamping groove.

When the elastic force reaches a predetermined value, or when the spring is in an initial state, the protrusion is fastened in the clamping groove, thus preventing the second sliding member 323 from being ejected from the sliding groove 313. In some embodiment, the guiding rod 33, the first component 31 and the second component 32 may be manufactured by an injection molding technology. The guiding rod 33 fastened in the first component 31 traverses through the guiding rod hole 322 in the second component 32. The guiding rod 33 fastened in the second component 32 traverses through the guiding rod hole 322 in the first component 31.

For the description set forth above, the sliding apparatus with a sliding module can be used in an electronic device with a sliding cover structure, for example, a smart phone. In the smart phone, the first component is configured in the sliding cover of the smart phone. The sliding cover comprises a screen to display an image or play a video; a functional keyboard to input instruction; a speaker to output sound; and a microphone to receive sound. The second component is configured in the main body of the smart phone. A keyboard is configured on the case of the main body to input characters. When the smart phone is in a closed status, the sliding cover is disposed right above the main body, and shields the keyboard. When opening the smart phone, a user pushes the cover to slide along the longitudinal direction of the main body.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A sliding module, comprising:
   a plurality of guiding rods;
   a plurality of elastic members;
   a first component having a first fastener and a plurality of guiding apertures; and
   a second component having a second fastener and a plurality of fastening holes that correspond to the plurality of guiding apertures of the first component;
   wherein
   the first component and the second component are configured to slide with respect to each other;
   each of the elastic members is configured to shield a respective guiding rod;
   each of the guiding rods is configured to be fastened in a respective fastening hole at the second component, and traverse through a respective guiding aperture at the first component;
   a longitudinal axis across the respective centers of the first fastener and the second fastener is configured to be parallel to each of the guiding rods; and
   the first component is configured to rotate around the center of the first fastener and the second component is configured to rotate around the center of the second fastener while the center of the first fastener and the center of the second fastener are moved along two parallel lines with respect to each other.

2. The sliding module according to claim 1, wherein the first component comprises a first sliding member having a sliding groove, and the second component comprises a second sliding member that is configured to slide along the sliding groove of the first sliding member.

3. The sliding module according to claim 2, wherein the first sliding member is configured to be disposed in the middle of the first component.

4. The sliding module according to claim 2, wherein the second sliding member further comprises a stopper disposed at one end of the second sliding member to prevent the second sliding member from disengaging the first sliding member.

5. The sliding module according to claim 2, wherein the guiding rods and the elastic members are disposed symmetrically on both sides of the first sliding member.

6. The sliding module according to claim 5, wherein each of the elastic members disposed on both sides of the first sliding member is compressed at substantially the same level when the longitudinal axis across the respective centers of the first fastener and the second fastener is perpendicular to a sliding direction between the first component and the second component.

7. The sliding module according to claim 6, wherein the first component is at a stationary point with respect to the second component when the longitudinal axis across the respective centers of the first fastener and the second fastener is perpendicular to the sliding direction between the first component and the second component.

8. The sliding module according to claim 6, wherein each of the elastic members disposed on both sides of the first sliding member is compressed at a maximum level when the longitudinal axis across the respective centers of the first fastener and the second fastener is perpendicular to a sliding direction between the first component and the second component.

9. A sliding apparatus comprising:
a main body;
a sliding case; and
a sliding module; wherein the sliding module is according to claim 1, and is configured to connect the main body and the sliding case.

10. A sliding apparatus according to claim 9, wherein the first fastener is configured to be connected to the main body and the second fastener is configured to be connected to the sliding case.

11. An electronic device comprising a sliding apparatus, wherein the sliding apparatus is according to claim 9.

12. The sliding module according to claim 1, wherein the second component has a plurality of guiding apertures and the first component has a plurality of fastening holes that correspond to the plurality of guiding apertures of the second component.

13. The sliding module according to claim 1, wherein the longitudinal axis across the respective centers of the first fastener and the second fastener is configured to be disposed in the middle of the sliding module.

14. The sliding module according to claim 1, wherein at least one of the elastic members is made of a spring.

15. The sliding module according to claim 1, wherein at least one of the guiding rods has a notch.

* * * * *